United States Patent
Shi et al.

(10) Patent No.: US 8,836,949 B1
(45) Date of Patent: Sep. 16, 2014

(54) SYSTEMS AND METHODS FOR CHARACTERIZING NEAR FIELD TRANSDUCER PERFORMANCE AT WAFER LEVEL USING ASYMMETRIC INTERFERENCE WAVEGUIDES

(71) Applicant: Western Digital (Fremont), LLC, Fremont, CA (US)

(72) Inventors: Zhong Shi, Dublin, CA (US); Michael V. Morelli, San Jose, CA (US); Hongxing Yuan, San Ramon, CA (US)

(73) Assignee: Western Digital (Fremont), LLC, Fremont, CA (US)

(*) Notice: Subject to any disclaimer, the term of this patent is extended or adjusted under 35 U.S.C. 154(b) by 15 days.

(21) Appl. No.: 13/621,728

(22) Filed: Sep. 17, 2012

(51) Int. Cl.
*G01B 9/02* (2006.01)
*G11B 5/02* (2006.01)

(52) U.S. Cl.
USPC .......... 356/477; 356/481; 360/59; 369/13.33; 369/13.13; 369/112.27

(58) Field of Classification Search
CPC ............ G02B 6/1226; G11B 2005/0021; G11B 5/314; G11B 5/6088; G11B 13/08; G11B 13/04; G11B 5/3133; G11B 5/1278; G11B 7/1387; G11B 2005/0005; G11B 2005/001; G11B 5/3163; G11B 5/4866; G11B 11/10536; G11B 2007/13727
USPC ................. 356/452–521; 360/59; 369/13.33, 369/13.13, 112.27, 112.09
See application file for complete search history.

(56) References Cited

U.S. PATENT DOCUMENTS

| | | | |
|---|---|---|---|
| 5,173,909 A | 12/1992 | Sakano et al. | |
| 5,341,391 A | 8/1994 | Ishimura | |
| 5,377,008 A * | 12/1994 | Ridgway et al. | 356/481 |
| 5,960,014 A | 9/1999 | Li et al. | |
| 6,982,843 B2 | 1/2006 | Coffey et al. | |
| 7,088,889 B2 * | 8/2006 | Takahashi et al. | 385/43 |
| 7,155,732 B2 * | 12/2006 | Rausch et al. | 720/659 |
| 7,171,080 B2 | 1/2007 | Rausch | |
| 7,177,491 B2 * | 2/2007 | Dave et al. | 385/11 |
| 7,310,206 B2 | 12/2007 | Liu et al. | |

(Continued)

OTHER PUBLICATIONS

Chubing Peng, William A. Challener, Amit Itagi, Mike Seigler, and Edward C. Gage, Surface-Plasmon Resonance Characterization of a Near-Field Transducer, IEEE Transactions on Magnetics, vol. 48, No. 5, May 2012.*

(Continued)

*Primary Examiner* — Gregory J Toatley
*Assistant Examiner* — Violeta A Prieto

(57) ABSTRACT

Systems and methods and apparatuses for characterizing near field transducer performance at wafer level using asymmetric interference waveguides are provided. One such system includes a light source, an input grating configured to receive light from the light source, a first waveguide arm and a second waveguide arm, each configured to receive the light, a surface plasmon receptor optically coupled to the first waveguide arm and the second waveguide arm and configured to receive light from the first waveguide arm in a first direction and the second waveguide arm in a second direction opposite of the first direction, where the first and the second waveguide arms are configured to induce a preselected phase difference in light arriving at the surface plasmon receptor, and an output grating optically coupled to the surface plasmon receptor, and a light detector coupled to, and configured to detect light from, the first output grating.

26 Claims, 3 Drawing Sheets

(56) References Cited

U.S. PATENT DOCUMENTS

| | | | |
|---|---|---|---|
| 7,486,709 B2 | 2/2009 | Hu et al. | |
| 7,580,602 B2* | 8/2009 | Itagi et al. | 385/37 |
| 7,688,689 B2 | 3/2010 | Gage et al. | |
| 7,839,497 B1* | 11/2010 | Rausch et al. | 356/256 |
| 7,852,587 B2* | 12/2010 | Albrecht et al. | 360/59 |
| 7,898,759 B2* | 3/2011 | Matsumoto et al. | 360/59 |
| 7,969,826 B2* | 6/2011 | Naniwa et al. | 369/13.13 |
| 8,102,736 B2* | 1/2012 | Takayama et al. | 369/13.33 |
| 8,169,881 B2* | 5/2012 | Balamane et al. | 369/112.27 |
| 8,605,556 B1* | 12/2013 | Peng et al. | 369/13.33 |
| 2001/0017820 A1 | 8/2001 | Akiyama et al. | |
| 2004/0001394 A1* | 1/2004 | Challener et al. | 369/13.32 |
| 2004/0257579 A1* | 12/2004 | Shirai et al. | 356/477 |
| 2005/0289576 A1 | 12/2005 | Challener | |
| 2006/0233061 A1 | 10/2006 | Rausch et al. | |
| 2008/0130155 A1* | 6/2008 | Naniwa et al. | 360/59 |
| 2008/0158730 A1 | 7/2008 | Furukawa et al. | |
| 2008/0181560 A1 | 7/2008 | Suh et al. | |
| 2008/0204916 A1 | 8/2008 | Matsumoto et al. | |
| 2009/0040645 A1 | 2/2009 | Shimazawa et al. | |
| 2011/0002199 A1* | 1/2011 | Takayama et al. | 369/13.24 |
| 2011/0103742 A1* | 5/2011 | Obara et al. | 385/27 |
| 2011/0149294 A1* | 6/2011 | Song | 356/477 |
| 2011/0305412 A1* | 12/2011 | Sugiyama | 385/2 |
| 2012/0019907 A1* | 1/2012 | Argoul et al. | 359/371 |
| 2012/0156802 A1* | 6/2012 | Flagan et al. | 436/501 |
| 2012/0327752 A1* | 12/2012 | Snyder | 369/13.13 |
| 2013/0108212 A1* | 5/2013 | Peng et al. | 385/15 |
| 2013/0223806 A1* | 8/2013 | Itagi | 385/132 |
| 2013/0277575 A1* | 10/2013 | Peng et al. | 250/459.1 |

OTHER PUBLICATIONS

Chubing Peng, Surface-plasmon resonance of a planar lollipop near-field transducer, Applied Physics Letters 94, 171106 (2009).*

Byoungho Lee, Seung-Yeol Lee, Junghyun Park, Il-Min Lee, and Sookyoung Roh, Plasmonic field enhancement and hot spot generation for sensorapplications, Proc. of SPIE vol. 8351, 83512P, (2012).*

Nan Zhou, Edward C. Kinzel, and Xianfan Xu, Nanoscale ridge aperture as near-field transducer for heat-assisted magnetic recording, Applied Optics / vol. 50, No. 31 / Nov. 1, 2011.*

W. A. Challener, Chubing Peng, A. V. Itagi, D. Karns, Wei Peng, Yingguo Peng, XiaoMin Yang, Xiaobin Zhu, N. J. Gokemeijer, Y.-T. Hsia, G. Ju, Robert E. Rottmayer, Michael A. Seigler and E. C. Gage, Heat-assisted magnetic recording by a near-field transducer with efficient optical energy transfer, Nature Photonics | vol. 3 | Apr. 220, 2009.*

Mark H. Kryder, Edward C. Gage, Terry W. McDaniel, William A. Challener, Robert E. Rottmayer, Ganping Ju, Yiao-Tee Hsia, and M. Fatih Erden, Heat Assisted Magnetic Recording, Proceedings of the IEEE | vol. 96, No. 11, Nov. 2008.*

Yunchuan Kong, Matt Chabalko, Eric Black, Stephen Powell, James A. Bain, T. E. Schlesinger, and Yi Luo, Evanescent Coupling Between Dielectric and Plasmonic Waveguides for HAMR Applications, IEEE Transactions on Magnetics, vol. 47, No. 10, Oct. 2011.*

* cited by examiner

SYSTEMS AND METHODS FOR CHARACTERIZING NEAR FIELD TRANSDUCER PERFORMANCE AT WAFER LEVEL USING ASYMMETRIC INTERFERENCE WAVEGUIDES

FIELD

The present invention relates to characterization of the performance of a plasmon element, and more particularly, systems and methods and apparatuses for characterizing near field transducer performance at wafer level using asymmetric interference waveguides.

BACKGROUND

In an energy-assisted magnetic recording (EAMR) system (e.g., hard disk), the minimum written bit size in the media is controlled by the minimum optical spot size produced by a near field transducer (NFT) acting as a plasmon element. In one design, the NFT has two portions, such as a disc and a pin, that serve different purposes. The disc converts electromagnetic energy of incident light into surface plasmons, and the pin channels a highly localized surface plasmon field to an air bearing surface (ABS). The performance of the NFT, both electric field intensity and spot size, depends on a number of NFT parameters such as core-NFT spacing, NFT-spacer interface, NFT size, NFT shape, NFT thickness, pin length, pin width, pin thickness, and NFT material. Additionally, the performance depends on the illumination conditions which are determined by the waveguide geometry (e.g., solid immersion minor or channel waveguide) and grating coupler design.

In the related art, device characterization is generally performed at bar or slider level. However, bar or slider level testing can be time consuming and expensive processes because they involve many backend processes (e.g., lapping process and other processes). In other related art, device characterization is attempted using a single disk NFT or multiple disk NFTs configured to interact with a conventional waveguide mode, or using a pump probe system for testing a single NFT on a wafer. However, both approaches exhibit shortcomings including poor signal to noise ratio and generally poor device characterization capabilities that make it difficult to draw conclusions from the test data. Therefore, it is desirable to develop improved systems and methods to characterize the performance of a wafer level NFT such that the testing and development cycles can be reduced.

SUMMARY

Aspects of the present invention relate to systems and methods and apparatuses for characterizing near field transducer performance at wafer level using asymmetric interference waveguides. In one embodiment, the invention relates to a system for characterizing performance of a surface plasmon receptor at wafer level, the system including a light source, an input grating configured to receive light from the light source, a splitter configured to receive the light from the input grating, a first waveguide arm, a second waveguide arm, where the splitter is configured to split the light into the first waveguide arm and the second waveguide arm, a surface plasmon receptor optically coupled to the first waveguide arm and the second waveguide arm and configured to receive light from the first waveguide arm in a first direction and the second waveguide arm in a second direction opposite of the first direction, where the first and the second waveguide arms are configured to induce a preselected phase difference in light arriving at the surface plasmon receptor, a third waveguide arm optically coupled to the surface plasmon receptor, a first output grating coupled to the third waveguide arm, and a light detector coupled to, and configured to detect light from, the first output grating.

In another embodiment, the invention relates to a method for characterizing performance of a surface plasmon receptor at wafer level, the method including providing a light source, providing an input grating configured to receive light from the light source, providing a splitter configured to receive the light from the input grating, providing a first waveguide arm, providing a second waveguide arm, where the splitter is configured to split the light into the first waveguide arm and the second waveguide arm, providing a surface plasmon receptor optically coupled to the first waveguide arm and the second waveguide arm and configured to receive light from the first waveguide arm in a first direction and the second waveguide arm in a second direction opposite of the first direction, where the first and the second waveguide arms are configured to induce a preselected phase difference in light arriving at the surface plasmon receptor, providing a third waveguide arm optically coupled to the surface plasmon receptor, providing a first output grating coupled to the third waveguide arm, providing a light detector coupled to, and configured to detect light from, the first output grating, generating light at the light source at a range of wavelengths, applying the light generated at the light source to the input grating, and determining a wavelength at which an output of the light detector is maximum for the range.

DETAILED DESCRIPTION

Figure 1:
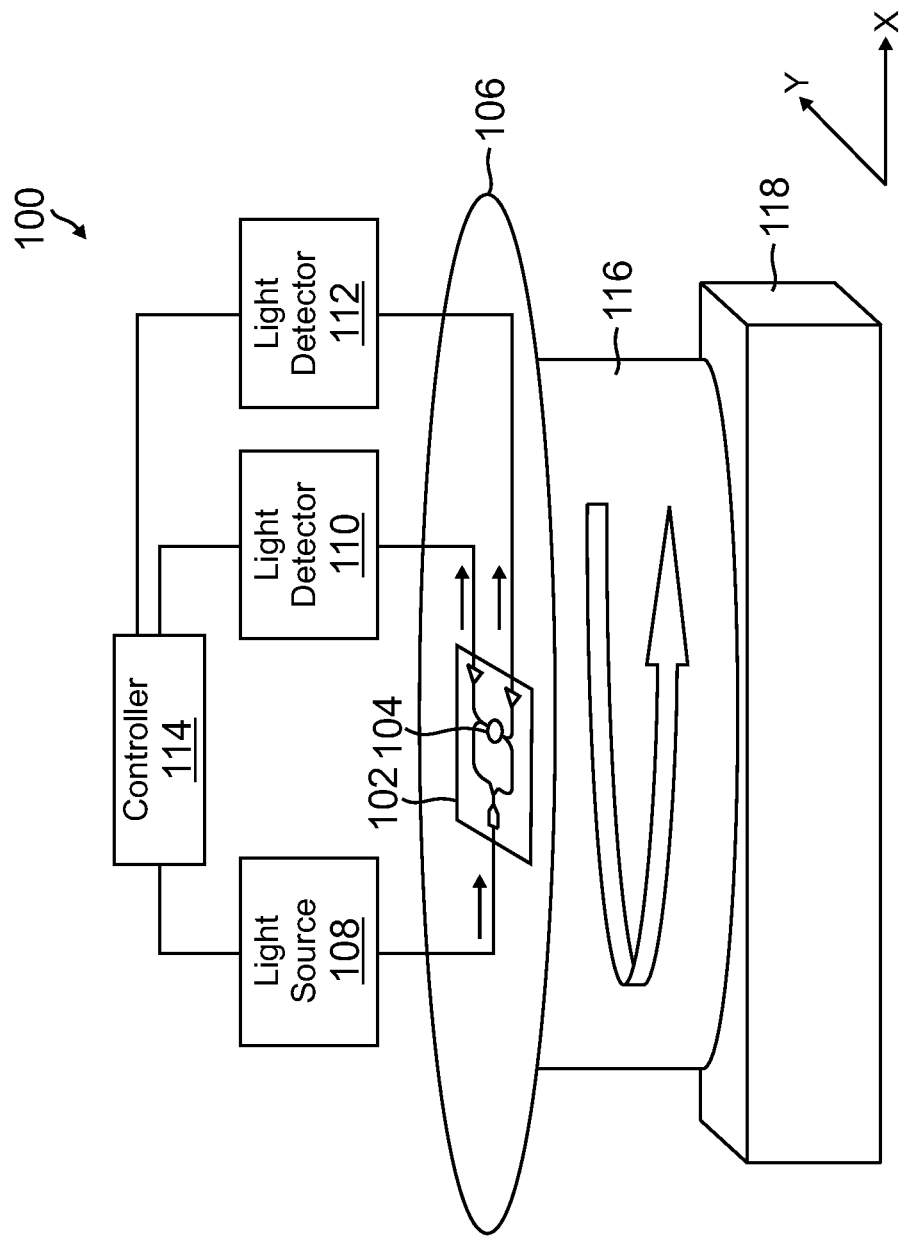
FIG. 1 is a perspective schematic view of a wafer level NFT characterization system including an asymmetric waveguide and an NFT under test positioned on a wafer in accordance with one embodiment of the invention.

Referring now to the drawings, embodiments of systems and methods for characterizing performance of a surface plasmon receptor, such as a near field transducer (NFT), are illustrated. The systems include a light source applied to an asymmetric waveguide optically coupled to a surface plasmon receptor, and a light detector optically coupled to an output of the asymmetric waveguide. The asymmetric waveguide includes an input grating configured to receive light from the light source, first and second waveguide arms configured to receive light from the input grating and direct it to the surface plasmon receptor from opposite directions. The first and second waveguide arms are also configured to induce a preselected phase difference in light arriving at the surface plasmon receptor. A third waveguide arm is optically coupled to the surface plasmon receptor and an output grating. The light detector is optically coupled to the output grating and is configured to detect light from the output grating.

In some embodiments, a fourth waveguide arm is also optically coupled to the surface plasmon receptor and second output grating. In such case, a second light detector is optically coupled to the second output grating and is configured to detect light from the second output grating. The light source can be controlled to scan through a range of wavelengths of light to determine a resonance signature and peak output of the surface plasmon receptor (e.g., wavelength tuning). This information can be used to adjust physical characteristics of the surface plasmon receptor during manufacturing to achieve optimal or preselected performance characteristics of the surface plasmon receptor. In several embodiments, the wavelength tuning and asymmetric waveguide enable relatively precise and accurate characterization of a surface plasmon receptor and tuning of manufacturing processes not found in conventional surface plasmon receptor testing systems (e.g., NFT testing systems).

FIG. 1 is a perspective schematic view of a wafer level NFT characterization system 100 including an asymmetric waveguide 102 and an NFT 104 under test positioned on a wafer 106 in accordance with one embodiment of the invention. The system 100 further includes a light source 108 configured to apply light to an input of the asymmetric waveguide 102 and first and second light detectors (110, 112) configured to receive light from outputs of the asymmetric waveguide 102. The NFT 104 is optically coupled to, and positioned within, the asymmetric waveguide 102. The system further includes a controller 114 coupled to the light source 108 and to the first and second light detectors (110, 112).

In operation, the controller 114 can be programmed to execute various performance analysis algorithms to test the performance of the NFT 104 using the light source 108 and light detectors (110, 112). In several embodiments, for example, the controller 114 can cause the light source 108 to scan through a range of wavelengths of light applied to the asymmetric waveguide 102 to determine a resonance signature and peak output of the NFT 104 based on light received by the light detectors (110, 112). In other embodiments, other suitable algorithms can be used by the controller 114 to characterize the NFT 104 using the asymmetric waveguide 102.

The system also includes a wafer platform 116 attached to the wafer 106 that can rotate the wafer 106 in manner illustrated by the arrow on the wafer platform 116 and a translation stage 118 that can provide for movement of the wafer 106 in the "X" and "Y" directions indicated. While only a single NFT and asymmetric waveguide are shown on the wafer 106, it may include a number of asymmetric waveguides and corresponding NFTs or, alternatively, a number of NFTs without corresponding asymmetric waveguides.

Figure 2:
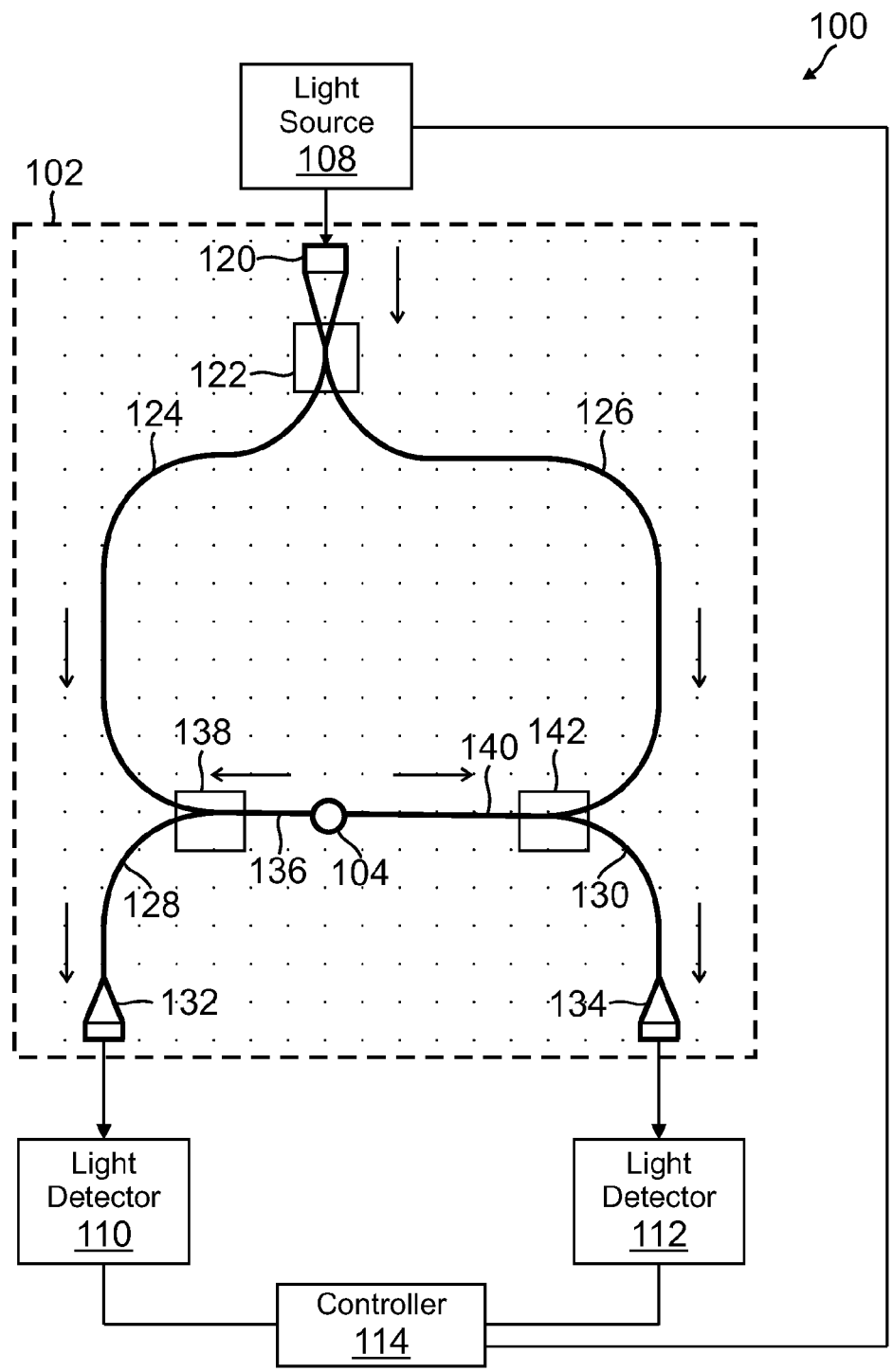
FIG. 2 is a top schematic view of the wafer level NFT characterization system of FIG. 1 including the asymmetric waveguide and NFT under test in accordance with one embodiment of the invention.

FIG. 2 is a top schematic view of the wafer level NFT characterization system 100 of FIG. 1 including the asymmetric waveguide 102 and NFT under test 104 in accordance with one embodiment of the invention. The asymmetric waveguide 102 includes an input grating 120 optically coupled to, and configured to receive light from, the light source 108. A first splitter 122 receives the light from the input grating 120 and splits it between a first waveguide arm 124 and a second waveguide arm 126. Light travelling along each of the first waveguide arm 124 and the second waveguide arm 126 forms a standing wave that interacts with the NFT 104 from opposite directions such that plasmon resonance is thereby excited. In several embodiments, it is preferable that the phase difference between the two counter-propagation beams of the first and second waveguide arms (124, 126) is about 180 degrees at the NFT 104 location in order to maximize NFT excitation efficiency. As can be seen in FIG. 2, light delivered to the NFT 104 from the first waveguide arm 124 and the second waveguide arm 126 arrives from opposite directions (e.g., directions are 180 degrees from one another).

The NFT 104 is also optically coupled to a third waveguide arm 128 and a fourth waveguide arm 130. The third waveguide arm 128 is coupled to a first output grating 132 and the fourth waveguide arm 130 is coupled to a second output grating 134. The third waveguide arm 128 branches off from a left NFT waveguide arm 136 at a second splitter 138. The first waveguide arm 124 also branches off from the left NFT waveguide arm 136 at the second splitter 138. The fourth waveguide arm 130 branches off from a right NFT waveguide arm 140 at a third splitter 142. The second waveguide arm 126 also branches off from the right NFT waveguide arm 140 at the third splitter 142. The left NFT waveguide arm 136 and the right NFT waveguide arm 140 extend to the NFT 104 and to the second splitter 138 and the third splitter 142, respectively.

In operation, and in several embodiments, the asymmetrical interference waveguide structure 102 is used in conjunction with wavelength tuning administered by the controller 114 via the light source 108 and light detectors (110, 112) to perform wafer level NFT characterization. More specifically, the output of the asymmetrical interference waveguide structure 102 can be coupled out through output grating (132, 134) and NFT plasmon resonance signature can be extracted from the output measurement. In several embodiments, the use of the asymmetric interference waveguide pattern to interact with the NFT substantially improves signal-to-noise ratio as compared to any prior art NFT characterization systems whether conducted at the wafer level, bar level or slider level.

In several embodiments, the length of the first arm waveguide 124 is different from the length of the second arm waveguide 126. For example, in FIG. 2, the length of the second arm waveguide 126 is greater than the length of the first arm waveguide 124. When the waveguide length difference is increased to a few micrometers or a few tens micrometers long, the phase difference between the two counter-propagating beams at the NFT location will be sensitive to the wavelength number applied in the asymmetric waveguide structure 102. This will bring about a very beneficial feature to compensate any undesirable phase variations which may be introduced by either process or material properties. In such case, NFT plasmon resonance can be maximized by compensating phase variation via wavelength tuning. In a number of embodiments, wavelength tuning can be within only a few nanometers to minimize the impact to NFT frequency response performance.

In several embodiments, each of the splitters (122, 138, 142) can be 3 decibel (dB) splitters or splitters having other suitable loss parameters. In the embodiment shown in FIG. 2, the asymmetric waveguide 102 is implemented such that the waveguide arms have unequal lengths. However, in other embodiments, other suitable asymmetric waveguide implementations can be used. For example, in some embodiments, the waveguide arms can have unequal widths or thicknesses, or apply one or more of a phase retarder, a heater, or an electric field on one of the two arms to induce a preselected phase delay.

In several embodiments, the light arriving via the first waveguide arm 124 interferes with the light arriving via the second waveguide arm 126 at the NFT 104. In a number of embodiments, process characteristics of the NFT can be modified based on the measured performance of NFT using the wafer level NFT characterization system 100 with the asymmetric waveguide 102. In several such embodiments, NFT characteristics such as size, material, and/or shape, defined during NFT fabrication, are modified based on the NFT performance results. In some embodiments, the NFT performance results include a determination of the wavelength at which the output of the light detector(s) is maximum in a preselected range of light.

It should be noted that the components of FIG. 2 are not drawn to scale. More specifically, while the NFT 104 is depicted in FIG. 2 as being larger than the adjacent waveguide arms for clarity, in many embodiments, the NFT 104 is smaller than the adjacent waveguide arms. For example, in several embodiments, the NFT 104 has a diameter in a range from about 200 nanometers to about 280 nanometers. In one such embodiment, the NFT 104 has a diameter of about 240 nanometers. In some embodiments, the width of the first and second waveguide arms (124, 126) is in a range of about 450 to 650 nanometers. In one such embodiment, the width of the first and second waveguide arms (124, 126) is about 550 nanometers. In one embodiment, the length of the first waveguide arm 124 is about 100 microns while the length of the second waveguide arm 126 is about 120 microns. In a number of embodiments, the difference in length between the first and second waveguide arms (124, 126) is in a range of about 10 to 40 microns. In one embodiment, the length of the left NFT waveguide arm 136 is about 20 microns and the length of the right NFT waveguide arm 140 is about 30 microns. In one embodiment, the length of the third waveguide arm 128 is about 30 microns and the length of the fourth waveguide arm 130 is about 30 microns. In other embodiments, each such component can have other suitable dimensions.

Figure 3:
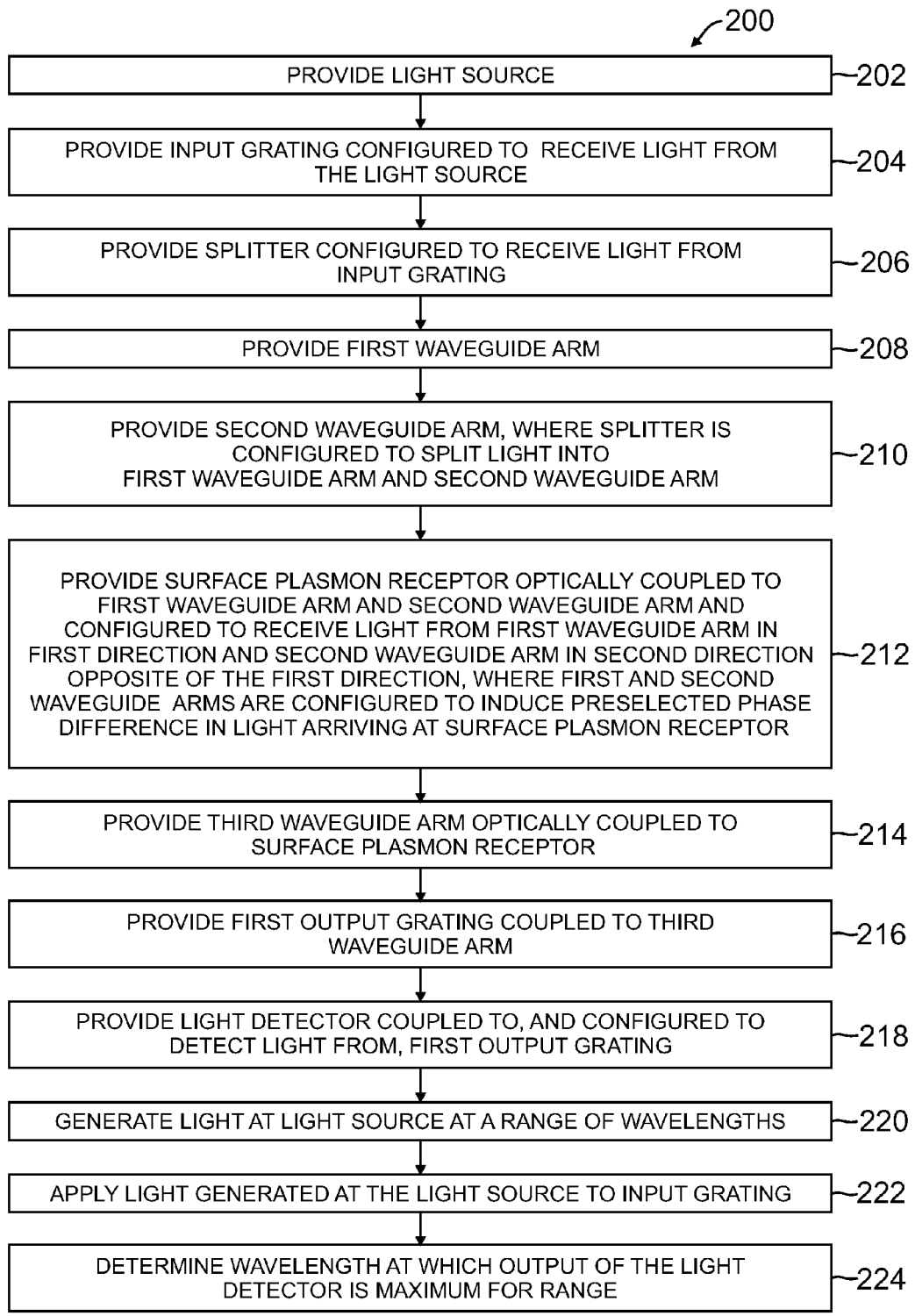
FIG. 3 is a flowchart of a process for operating a wafer level NFT characterization system including an asymmetric waveguide and NFT in accordance with one embodiment of the invention.

FIG. 3 is a flowchart of a process 200 for operating a wafer level NFT characterization system including an asymmetric waveguide and NFT in accordance with one embodiment of the invention. In particular embodiments, the process 200 can be used in conjunction with the wafer level NFT characterization systems of FIGS. 1 and 2. The process first provides (202) a light source. The process then provides (204) an input grating configured to receive light from the light source. The process provides (206) a splitter configured to receive the light from the input grating. The process then provides (208) a first waveguide arm. The process provides (210) a second waveguide arm, where the splitter is configured to split the light into the first waveguide arm and the second waveguide arm. The process then provides (212) a surface plasmon receptor optically coupled to the first waveguide arm and the second waveguide arm and configured to receive light from the first waveguide arm in a first direction and the second waveguide arm in a second direction opposite of the first direction, where the first and the second waveguide arms are configured to induce a preselected phase difference in light arriving at the surface plasmon receptor.

The process provides (214) a third waveguide arm optically coupled to the surface plasmon receptor. The process then provides (216) a first output grating coupled to the third waveguide arm. The process provides (218) a light detector coupled to, and configured to detect light from, the first output grating. The process then generates (220) light at the light source at a range of wavelengths. The process applies (222) the light generated at the light source to the input grating. The process then determines (224) a wavelength at which an output of the light detector is maximum for the range. In several embodiments, the process can use these performance results to modify processes for manufacturing the surface plasmon receptors (e.g., NFTs), including characteristics such as size, material, and/or shape. In several embodiments, the manufacturing processes relate to disk shaped NFTs and the size of those NFTs can be modified in conjunction with the performance test results obtained from an NFT positioned on a wafer (e.g., before it is subject to further processing such as dicing to form bars and/or lapping to form sliders).

In one embodiment, the process can perform the sequence of actions in a different order. In another embodiment, the process can skip one or more of the actions. In other embodiments, one or more of the actions are performed simultaneously. In some embodiments, additional actions can be performed.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

What is claimed is:

1. A system for characterizing performance of a surface plasmon receptor at wafer level, the system comprising:
a light source;
an input grating configured to receive light from the light source;
a splitter configured to receive the light from the input grating;
a first waveguide arm;
a second waveguide arm, wherein the splitter is configured to split the light into the first waveguide arm and the second waveguide arm;
a surface plasmon receptor optically coupled to the first waveguide arm and the second waveguide arm and configured to receive light from the first waveguide arm in a first direction and the second waveguide arm in a second direction opposite of the first direction, wherein the first and the second waveguide arms are configured to induce a preselected phase difference in light arriving at the surface plasmon receptor;
a third waveguide arm optically coupled to the surface plasmon receptor;
a first output grating coupled to the third waveguide arm; and
a light detector coupled to, and configured to detect light from, the first output grating.

2. The system of claim 1, wherein the first waveguide arm and the second waveguide arm are configured to facilitate a wavelength tuning of light arriving at the surface plasmon receptor.

3. The system of claim 1, wherein a length of the first waveguide arm is unequal to a length of the second waveguide arm.

4. The system of claim 1, further comprising:
a fourth waveguide arm optically coupled to the surface plasmon receptor; and
a second output grating coupled to the fourth waveguide arm,
wherein the light detector is coupled to, and configured to detect light from, the second output grating.

5. The system of claim 4, further comprising:
a second splitter disposed along the first waveguide and configured to receive light from the surface plasmon receptor, wherein the third waveguide arm extends from the second splitter to the first output grating; and
a third splitter disposed along the second waveguide and configured to receive light from the surface plasmon receptor, wherein the fourth waveguide arm extends from the third splitter to the second output grating.

6. The system of claim 1, further comprising a controller coupled to the light source and the light detector, wherein the controller is configured to scan through a range of wavelengths of light generated by the light source.

7. The system of claim 6, wherein the controller is configured to determine a resonance signature of the surface plasmon receptor.

8. The system of claim 6, wherein the controller is configured to determine a wavelength of light for a peak output at the light detector.

9. The system of claim 8, wherein a position of the surface plasmon receptor between the first waveguide arm and the second waveguide arm is adjusted based on the peak output.

10. The system of claim 1, wherein the first and the second waveguide arms are configured such that light arriving at the surface plasmon receptor from the first waveguide arm interferes with light arriving at the surface plasmon receptor from the second waveguide arm.

11. The system of claim 1, wherein the light detected by the light detector is for generating a measured performance of the surface plasmon receptor, and the measured performance is for adjusting a fabrication of the surface plasmon receptor.

12. The system of claim 11, wherein the measured performance is for adjusting a preselected characteristic of the surface plasmon receptor during the fabrication, wherein the preselected characteristic is selected from the group consisting of a size, a material, a shape, and combinations thereof.

13. The system of claim 1, wherein the surface plasmon receptor comprises a near field transducer (NFT).

14. The system of claim 13, wherein the NFT comprises a disk shape.

15. A method for characterizing performance of a surface plasmon receptor at wafer level, the method comprising:
    providing a light source;
    providing an input grating configured to receive light from the light source;
    providing a splitter configured to receive the light from the input grating;
    providing a first waveguide arm;
    providing a second waveguide arm, wherein the splitter is configured to split the light into the first waveguide arm and the second waveguide arm;
    providing a surface plasmon receptor optically coupled to the first waveguide arm and the second waveguide arm and configured to receive light from the first waveguide arm in a first direction and the second waveguide arm in a second direction opposite of the first direction, wherein the first and the second waveguide arms are configured to induce a preselected phase difference in light arriving at the surface plasmon receptor;
    providing a third waveguide arm optically coupled to the surface plasmon receptor;
    providing a first output grating coupled to the third waveguide arm;
    providing a light detector coupled to, and configured to detect light from, the first output grating;
    generating light at the light source at a range of wavelengths;
    applying the light generated at the light source to the input grating; and
    determining a wavelength at which an output of the light detector is maximum for the range.

16. The method of claim 15, further comprising adjusting a process for manufacturing devices comprising the surface plasmon receptor based on a measured performance of the surface plasmon receptor including the wavelength at which the output of the light detector is maximum.

17. The method of claim 16, wherein the adjusting the process for manufacturing devices comprising the surface plasmon receptor comprises adjusting a preselected characteristic of the surface plasmon receptor based on the measured performance of the surface plasmon receptor, wherein the preselected characteristic is selected from the group consisting of a size, a material, a shape, and combinations thereof.

18. The method of claim 17, wherein the first waveguide arm and the second waveguide arm are configured to facilitate a wavelength tuning of light arriving at the surface plasmon receptor.

19. The method of claim 15, wherein a length of the first waveguide arm is unequal to a length of the second waveguide arm.

20. The method of claim 15, further comprising:
    a fourth waveguide arm optically coupled to the surface plasmon receptor; and
    a second output grating coupled to the fourth waveguide arm,
    wherein the light detector is coupled to, and configured to detect light from, the second output grating.

21. The method of claim 20, further comprising:
    a second splitter disposed along the first waveguide and configured to receive light from the surface plasmon receptor, wherein the third waveguide arm extends from the second splitter to the first output grating; and
    a third splitter disposed along the second waveguide and configured to receive light from the surface plasmon receptor, wherein the fourth waveguide arm extends from the third splitter to the second output grating.

22. The method of claim 15, further comprising determining a resonance signature of the surface plasmon receptor.

23. The method of claim 15, wherein a position of the surface plasmon receptor between the first waveguide arm and the second waveguide arm is adjusted based on the wavelength at which the output of the light detector is maximum for the range.

24. The method of claim 15, wherein the first and the second waveguide arms are configured such that light arriving at the surface plasmon receptor from the first waveguide arm interferes with light arriving at the surface plasmon receptor from the second waveguide arm.

25. The method of claim 15, wherein the surface plasmon receptor comprises a near field transducer (NFT).

26. The method of claim 25, wherein the NFT comprises a disk shape.

* * * * *